United States Patent [19]

Clancy et al.

[11] Patent Number: 4,821,184
[45] Date of Patent: Apr. 11, 1989

[54] UNIVERSAL ADDRESSING SYSTEM FOR A DIGITAL DATA PROCESSING SYSTEM

[75] Inventors: Gerald F. Clancy, Saratoga, Calif.; Craig J. Mundie, Cary; Stephen I. Schleimer, Chapel Hill, both of N.C.; Steven J. Wallach, Saratoga, Calif.; Richard G. Bratt, Wayland, Mass.

[73] Assignee: Data General Corporation, Westboro, Mass.

[21] Appl. No.: 647,272

[22] Filed: Sep. 4, 1984

Related U.S. Application Data

[63] Continuation of Ser. No. 266,530, May 22, 1981, abandoned.

[51] Int. Cl.$^4$ .............................................. G06F 12/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,618,045 | 11/1971 | Campbell | 364/200 |
| 3,639,912 | 2/1972 | Campbell | 364/200 |
| 3,739,352 | 6/1973 | Packard | 364/200 |
| 3,902,163 | 8/1975 | Amdahl | 364/200 |
| 3,902,164 | 8/1975 | Kelley | 364/200 |
| 3,967,247 | 6/1976 | Andersen | 364/200 |
| 4,056,844 | 11/1977 | Izumi | 364/200 |
| 4,079,451 | 3/1978 | Woods | 364/200 |
| 4,079,453 | 3/1978 | Dahl | 364/200 |
| 4,084,228 | 4/1978 | Dufond | 364/200 |
| 4,121,286 | 10/1978 | Venton et al. | 364/200 |
| 4,133,030 | 1/1979 | Huettner | 364/200 |
| 4,148,098 | 4/1979 | McCreight | 364/200 |
| 4,325,120 | 4/1982 | Colley et al. | 364/200 |
| 4,394,731 | 7/1983 | Flusche et al. | 364/200 |

Primary Examiner—David Y. Eng
Attorney, Agent, or Firm—Robert F. O'Connell

[57] ABSTRACT

A universal addressing system for use in a digital data processing system including a universal memory for storing data including instructions and at least one local system having access to the universal memory. The universal memory is organized into objects, and each item of data is associated with an object. Each object is specified by a unique identifier, and data is addressed by means of a logical address which specifies the UID of the object containing the data and the offset of the data in the object. A processor in the local system responds to instructions by providing memory operation specifiers to the universal memory. Each memory operation specifier specifies a memory operation and a logical address. The offset in the logical address may specify any bit in the object. The memory operation specifier also specifies a length in bits. The universal memory responds to the memory operation specifier by performing the operation specified by the memory operation specifier on the data item beginning at the location specified by the logical address and containing the specified number of bits.

19 Claims, 1 Drawing Sheet

UNIVERSAL ADDRESSING SYSTEM FOR A DIGITAL DATA PROCESSING SYSTEM

This application is a continuation of application Ser. No. 266,530, filed May 22, 1981, now abandoned.

CROSS RREFERENCE TO RELATED APPLICATIONS

The present patent application is related to U.S. Pat. App. Ser. No. 06/266,534 filed on even date with the present application and assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics. First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to effeciently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the systems's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to addressing systems in digital computer systems. The digital computer system in which the present invention is employed includes at least one local system including a processor and a universal memory accessible to the local system for storing data including instructions. The universal memory is organized into objects, and each item of data is associated with an object. Each object is specified by a unique identifier, and data is addressed by means of a logical address which specifies the UID of the object containing the data and the offset of the data in the object. In response to instructions, the processor provides memory operation specifiers to the universal memory. Each memory operation specifier specifies a memory operation and a logical address. The universal memory responds to the memory operation specifier by performing the specified operation on the data specified by the logical address.

It is thus an object of the invention to provide an improved digital computer system.

It is a further object of the invention to provide a universal memory for a digital computer system.

It is another object of the invention to provide a universal memory organized into objects identified by unique identifiers.

It is still further object of the invention to provide a universal memory responsive to logical addresses specifying an object containing data and the offset of data in the object.

Other objects, advantages and features of the present invention will be understood by those of ordinary skill in the art, after referring to the following detailed description of the preferred embodiments and drawings wherein:

Figure 1:
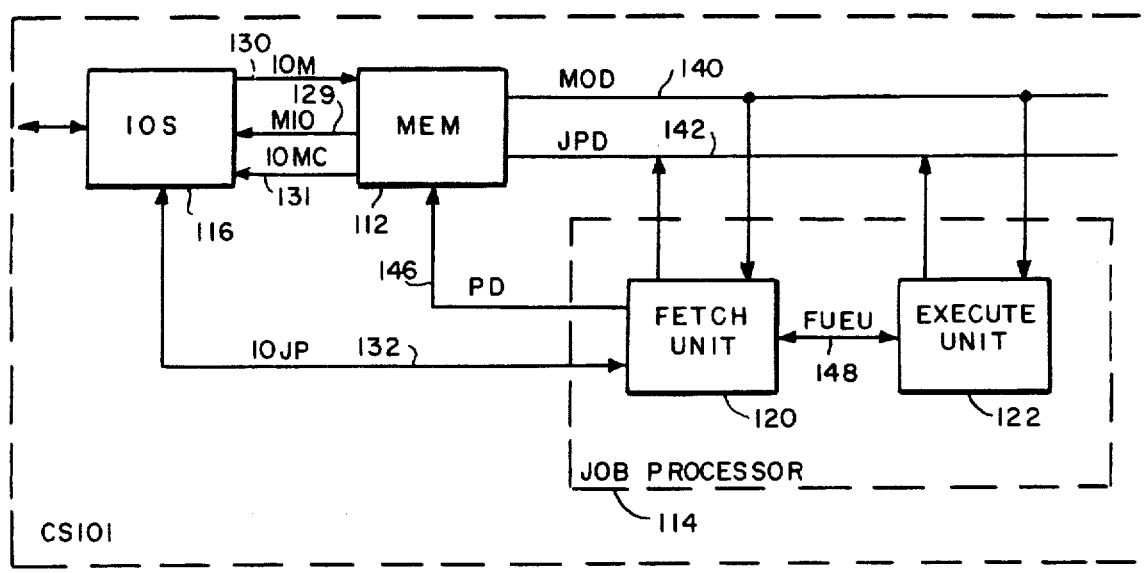
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

What is claimed is:

1. In a digital data processing system including at least one local digital data processing system, each said at least one local system including processor means for processing data items in response to instructions, a universal addressing system for addressing said data items comprising:
   (1) universal logical memory means accessible to each said at least one local system for storing and providing said data items,
   (2) memory organization means for organizing said universal memory means into objects uniquely and permanently identified by unique identifiers, each said data item being associated with a said object and addressable by means of a logical address specifying the unique identifier for said object with which said data item is associated and an offset specifying the locations of said data item in said associated object
   (3) means in said processor means for providing memory operation specifiers in response to said instructions, said memory operation specifiers each including a logical address and a memory command specifying a memory operation, and
   (4) memory operation means responsive to a memory operation specifier for accessing the data item and performing the memory operation specified by the memory command in said memory operation specifier on the data item specified by the logical address in said memory operation specifier.

2. In the digital data processing system of claim 1, and further wherein: said memory operation specifier further includes a length
   specifier specifying the length of said data item at the location specified by said logical address and
   said memory operation means accesses the data item and performs the memory operation specified by said memory command on said data item at the location specified by the logical address having the length specified by said length specifier.

3. In the digital data processing system of claim 2, and further wherein said length specifier specifies the length in bits.

4. In the digital data processing system of claim 1, and further wherein said offset is a bit-granular offset and may specify any bit of the data item associated with the object specified in said logical address.

5. In the digital data processing system of claim 1, and wherein:
   said memory organization means identifies each said object with a single said unique identifier and said single unique identifier never identifies any other said object.

6. In the digital data processing system of claim 1, and wherein:
   said unique identifier contains 80 bits.

7. In the digital data processing system of claim 1, and wherein:
   said memory organization means includes means for organizing said universal memory means into a plurality of logical allocation units, each said object being associated with one of said logical allocation units, and
   said unique identifier further includes
   (a) a logical allocation unit identifier specifying a logical allocation unit associated with said object identified by said unique identifier and
   (b) an object serial number identifying said object in said associated logical allocation unit.

8. In the digital data processing system of claim 7, and wherein:
   said memory organization means identifies each said logical allocation unit with a single said logical allocation unit identifier and said single logical allocation unit identifier never identifies any other said logical allocation unit and
   said memory organization means identifies each said object associated with said logical allocation unit with a single said object serial number and said object serial number never identifies any other said object associated with said logical allocation unit.

9. In the digital data processing system of claim 7, and wherein:
   said logical allocation unit identifier further includes
   (i) a logical allocation unit group number specifying a logical allocation group including a plurality of said logical allocation units and
   (ii) a logical allocation unit serial number identifying one of said logical allocation units of said plurality of logical allocation units.

10. In the digital data processing system of claim 9, and wherein:
   said memory organization means identifies each one of said plurality of logical allocation unit groups with a single said logical allocation unit group number and said single logical allocation unit group number never identifies any other said logical allocation unit group and said memory organization means identifies each said logical allocation unit associated with said logical allocation unit group identified by said logical allocation unit group number with a single said logical allocation unit serial number and said single logical allocation unit serial number never identifies any other said logical allocation unit in said logical allocation unit group specified by said logical allocation unit group number.

11. In the digital data processing system of claim 9, and wherein:

said logical allocation unit group number contains 24 bits;

said logical allocation unit serial number contains 8 bits;

said object serial number contains 48 bits; and said offset identifies s single bit which may be any bit in said items associated with said object identified by said unique identifier.

12. In the digital data processing claim 10, and wherein said universal identifiers specify locations of said objects independently of the locations of other said objects.

13. A digital data processing system comprising:

(1) universal logical memory means for storing and providing items of data including instructions, (2) memory organization means for organizing said universal logical memory means into objects uniquely and permanently identified by unique identifiers, each said data item being associated with a said object and addressable by means of a logical address specifying the unique identifier of the object with which said data item is associated and an offset specifying the location of said data item in said associated object, and (3) at least one local digital data processing system having access to said universal logical memory means and including processor means for processing said data items and providing memory operation specifiers in response to said instructions, said memory operation specifiers each including a logical address and a memory command specifying a memory operation, and (4) memory operation means responsive to a memory operation specifier for accessing the data item and performing the memory operation specified by the memory command on the data item specified by said logical address.

14. In the digital data processing system of claim 13, and further wherein: said universal logical memory means further includes (A) global memory means for storing data items associated with said objects, and (B) local memory means responsive to a memory operation specifier connected to said processer means, and having access to said global memory means for receving copies of said data items from said global memory means and providing altered copies of said data items to said global memory means and for performing the memory operation specified in said memory specifier on the copy of the data item specified by the logical address in said memory operation specifier;

said memory organizaiton means further includes a logical allocation unit directory item in said global memory means including a plurality of logical allocation unit directory entry items for defining said objects, each one of said logical allocation unit directory entry items including (i) an object identifier item whose value is the object identifier specifying the object defined by said logical allocation unit directory entry item, and (ii) a data location item specifying a location of data items belonging to said defined object in said global memory; and said memory operation means further includes (A) a local memory control table in said local memory means accessible by means of said logical addresses for indicating whether the copy of the data item specified by said logical address is present in said local memory and the location of said data item in said local memory, and (B) virtual memory management means operating in said local memory means and responsive to said logical addresses for translating the logical address specifying said data item into the location of the copy of said data item in said local memory means when said local memory control table indicates that said copy is present in said local memory means and otherwise determining the location of said data item in said global memory means by means of said logical address and said logical allocation unit directory and fetching said copy from said global memory means to said local memory means.

15. In the digital data processing system of claim 14, and wherein:

said digital data processing system includes a first plurality of said processor means and a second plurality of said local memory means and each one of said processor means in said first plurality is associated with one of said local memory means in said second plurality.

16. In the digital data processing system of claim 14, and wherein:

said global memory means includes a mass storage device and said local memory means includes randon-access memory means.

17. In the digital data processing system of claim 13, and further wherein:

said logical address specifies said unique identifier by an object number temporarily corresponding to said unique identifier in said local system, and said memory operation means further includes (a) an object table of data items associated with said at least one local digital data processing system for specifying said temporary correspondence, and (b) universal identifier conversion means associated with said at least one local digital data processing system for establishing said temporary correspondence in said object table and using said object table to obtain said unique identifier corresponding to said object number when said temporary correspondence has been established.

18. In the digital data processing system of claim 14, and further wherein:

said memory organization means further includes
means for generating a unique identifier, and object creation means for creating an object by receiving said universal identifier and creating a said logical allocation unit directory entry for said universal identifier.

19. In the digital data processing system of claim 18, and further wherein:

said memory organization means further includes means for associating each said object with one of a plurality of logical allocation units, a logical allocation unit directory containing the logical allocation unit directory entry for the object associated with said associated logical allocation unit;

each said logical allocation unit has a unique logical allocation unit identifier;

the universal identifier for each said object contains the logical allocation unit identifier for said associated logical allocation unit and an object serial number which is unique in said logical allocation unit; and said unique identifier generating means receives said logical allocation unit identifier and provides the universal identifier containing said logical allocation unit identifier and said unique object serial number.

* * * * *